(12) United States Patent
Soupal

(10) Patent No.: US 7,204,563 B2
(45) Date of Patent: Apr. 17, 2007

(54) PARK BRAKE INTERLOCK AND TRAILER BRAKE VALVE ASSEMBLY

(75) Inventor: Thomas R. Soupal, Rochester Hills, MI (US)

(73) Assignee: Meritor WABCO Vehicle Control Systems, Troy, MI (US)

( * ) Notice: Subject to any disclaimer, the term of this patent is extended or adjusted under 35 U.S.C. 154(b) by 0 days.

(21) Appl. No.: 10/962,956

(22) Filed: Oct. 12, 2004

(65) Prior Publication Data

US 2006/0076823 A1 Apr. 13, 2006

(51) Int. Cl.
*B60T 13/00* (2006.01)

(52) U.S. Cl. ............................................. 303/7; 303/15
(58) Field of Classification Search .................... 303/7, 303/15, 20, 3
See application file for complete search history.

(56) References Cited

U.S. PATENT DOCUMENTS

| 4,018,485 | A | * | 4/1977 | Fannin | 303/13 |
| 4,230,373 | A | * | 10/1980 | Plantan | 303/7 |
| 4,232,908 | A | * | 11/1980 | Stearns | 303/9 |
| 4,261,624 | A | * | 4/1981 | Plantan | 303/7 |
| 4,605,262 | A | * | 8/1986 | Bartholomew | 303/84.1 |
| 4,657,311 | A | * | 4/1987 | Fannin | 303/71 |
| 4,673,222 | A | * | 6/1987 | Knight | 303/9 |
| 5,046,786 | A | * | 9/1991 | Johnston et al. | 303/7 |
| 5,226,692 | A | * | 7/1993 | Eberling | 303/8 |
| 6,729,696 | B2 | * | 5/2004 | Kemer et al. | 303/7 |
| 2002/0167219 | A1 | * | 11/2002 | Kemer et al. | 303/7 |

* cited by examiner

*Primary Examiner*—Robert A. Siconolfi
(74) *Attorney, Agent, or Firm*—Carlson, Gaskey, & Olds

(57) ABSTRACT

A brake system for a tractor-trailer vehicle includes a service brake system and a park brake system. The service and park brake systems are used to brake both a tractor and a trailer towed by the tractor. A trailer hand control valve is actuated by a vehicle operator to brake the trailer. The park brake system includes a park brake control valve that receives input commands from the vehicle operator to apply and release park brakes on the tractor and the trailer. An interlock valve assembly fluidly connects the park brake control valve to primary and secondary air supplies. The trailer hand control valve is also fluidly connected to the interlock valve assembly. The interlock valve assembly includes an outlet port that supplies an air signal to the trailer from one of the primary air source, secondary air source, or trailer hand control valve via a single connection line.

15 Claims, 3 Drawing Sheets

PARK BRAKE INTERLOCK AND TRAILER BRAKE VALVE ASSEMBLY

TECHNICAL FIELD

The subject invention generally relates to a park brake interlock valve assembly that communicates an air signal to a tractor protection valve. Specifically, one of a primary air supply, a secondary air supply, or a trailer hand control valve generates the air signal, which is communicated from the park brake interlock assembly to the tractor protection valve through a common connection line.

BACKGROUND OF THE INVENTION

A brake system for a tractor-trailer vehicle includes a service brake system and a park brake system. The service and park brake systems are used to brake both a tractor and a trailer towed by the tractor. The service brake system includes service brakes that are used to slow or stop the vehicle during normal vehicle operation. The park brake system includes park brakes that are moved between a released position and an applied position where wheel rotation is prevented during a parking phase. The park brake system includes a park brake control valve that receives input from an actuator located within a tractor cab of the vehicle. A vehicle operator controls the park brake control valve and actuator to apply and release park brakes in both the tractor and the trailer.

A trailer hand control valve is also located with the tractor cab and is actuated by the vehicle operator to brake the trailer. The trailer hand control valve is fluidly connected to a tractor protection valve. The tractor protection valve is also fluidly connected to a primary air supply and a secondary, back-up, air supply. Thus, three air connections are required to be routed through the tractor to the trailer. The tractor protection valve is connected to the trailer with glad hands connectors. Air for applying the trailer brakes is communicated from either the primary air supply, secondary air supply, or trailer hand control valve to the tractor protection valve.

Check valves are incorporated into the tractor protection valve to control and direct airflow for applying trailer service brakes. Check valves are also incorporated into the park brake control valve to control and direct air flow to the park brakes on both the tractor and the trailer.

One disadvantage with this traditional configuration concerns the incorporation of the check valves into the park brake control valve and the tractor protection valve. The park brake control valve is located within the tractor cab close to the actuator, which is typically located on a vehicle dash. Further, the park brake control valve is fluidly connected to the primary air supply and the secondary air supply. This requires at least two different air connections to the check valve. These air connections must be plumbed through the tractor, which is difficult due to packaging space constraints. Similarly, incorporating check valves into the tractor protection valve is also difficult due to packaging constraints.

Another disadvantage is that three separate air connections are required to be routed through the tractor to the trailer to provide the appropriate air signals to the tractor protection valve. It is difficult to route and plumb three separate air connections to the tractor protection valve due to limited space constraints. Further, using multiple air connections to the tractor protection valve increases cost and assembly time.

Thus, there is a need for a service and park brake valve assembly that can transmit an air signal from a primary air supply, secondary air supply, or trailer hand control valve to a tractor protection valve without requiring multiple air connections. The service and park brake valve assembly should also eliminate the need for check valves in the tractor protection valve and park brake control valve, in addition to overcoming the other deficiencies in the prior art discussed above.

SUMMARY OF THE INVENTION

A brake system for a heavy-duty vehicle, such as a tractor-trailer vehicle, includes a service brake system and a park brake system. A trailer hand control valve is actuated by a vehicle operator to brake a trailer, which is towed by the tractor. The park brake system includes a park brake control valve that receives input commands from the vehicle operator to apply and release park brakes on the tractor and the trailer. An interlock valve assembly fluidly connects the park brake control valve to primary and secondary air supplies. The trailer hand control valve is also fluidly connected to the interlock valve assembly. The interlock valve assembly includes a trailer outlet port that supplies an air signal to the trailer from one of the primary air source, secondary air source, or trailer hand control valve via a single connection line.

The interlock valve assembly also cooperates with the park brake control valve to release park brakes only when the service brakes have been applied. In other words, if the vehicle operator attempts to release the park brakes by actuating the park brake control valve, the park brakes will only be released if the vehicle operator is also actuating the service brakes at the same time.

The interlock valve assembly includes a valve body having a plurality of inlets and a plurality of outlets, and a plurality of check valves. As discussed above, the interlock valve assembly is in fluid communication with a primary air supply and a secondary air supply. The primary and secondary air supplies preferably operate independently from each other such that if one of the primary and secondary air supplies has a failure, the other of the primary and secondary air supplies can serve as a back-up.

In this configuration, the valve body includes a first inlet port in fluid communication with the primary air supply and a second inlet port in fluid communication with the secondary air supply. A first two-way check valve controls fluid flow from the first and second inlet ports to a park brake outlet port. The valve body also includes a third inlet port in fluid communication with the primary air supply via a service brake control valve and a fourth inlet port in fluid communication with the secondary air supply via the service brake control valve. A second two-way check valve controls fluid flow from the third and fourth inlet ports in response to a service brake application.

A piston is slidably received within a piston chamber formed within the valve body. When the service brakes are applied, air is supplied from the primary and secondary air supplies to the third and fourth inlet ports. Depending on which of the primary and secondary air supply has the higher pressure, the second two-way check valve fluidly connects one of the third and fourth inlet ports to the piston chamber. The pressurized air supplied to the piston chamber moves the piston, which fluidly connects one of the first and second inlet ports to the park brake outlet port. Thus, when the service brake is applied, the interlock valve is moved to an open position and the park brake can be released if a park release command is communicated to the park brake control valve.

The valve body also includes a trailer inlet port fluidly connected to the trailer hand control valve. As discussed above, the valve body includes the trailer outlet port that communicates the air signal to the trailer. The air signal is sent from the trailer outlet port to a tractor protection valve, which is connected to the trailer. A two-way check valve is received within the valve body and controls whether the hand control valve or one of the primary or secondary air supplies provides the air signal to the tractor protection valve. When the vehicle operator actuates the trailer hand control valve, the two-way check valve closes off fluid communication through the valve body with the primary and secondary air supplies. Thus, the air signal is communicated to the tractor protection valve from the trailer hand control valve. If the trailer hand control valve is not actuated by the vehicle operator, the two-way check valve closes off fluid communication of the trailer hand control valve to the trailer inlet port, and one of the primary or secondary air supplies provides air supply through the valve body to the trailer outlet port.

The unique interlock valve assembly provides an air signal to a tractor protection valve for application of trailer brakes from either the primary air supply, secondary air supply, or trailer hand control valve with a single line connection. This reduces the number of connection lines that are required be plumbed to the tractor protection valve, which significantly reduces cost and facilitates assembly.

These and other features of the present invention can be best understood from the following specification and drawings, the following of which is a brief description.

DETAILED DESCRIPTION OF THE PREFERRED EMBODIMENT

Figure 1:
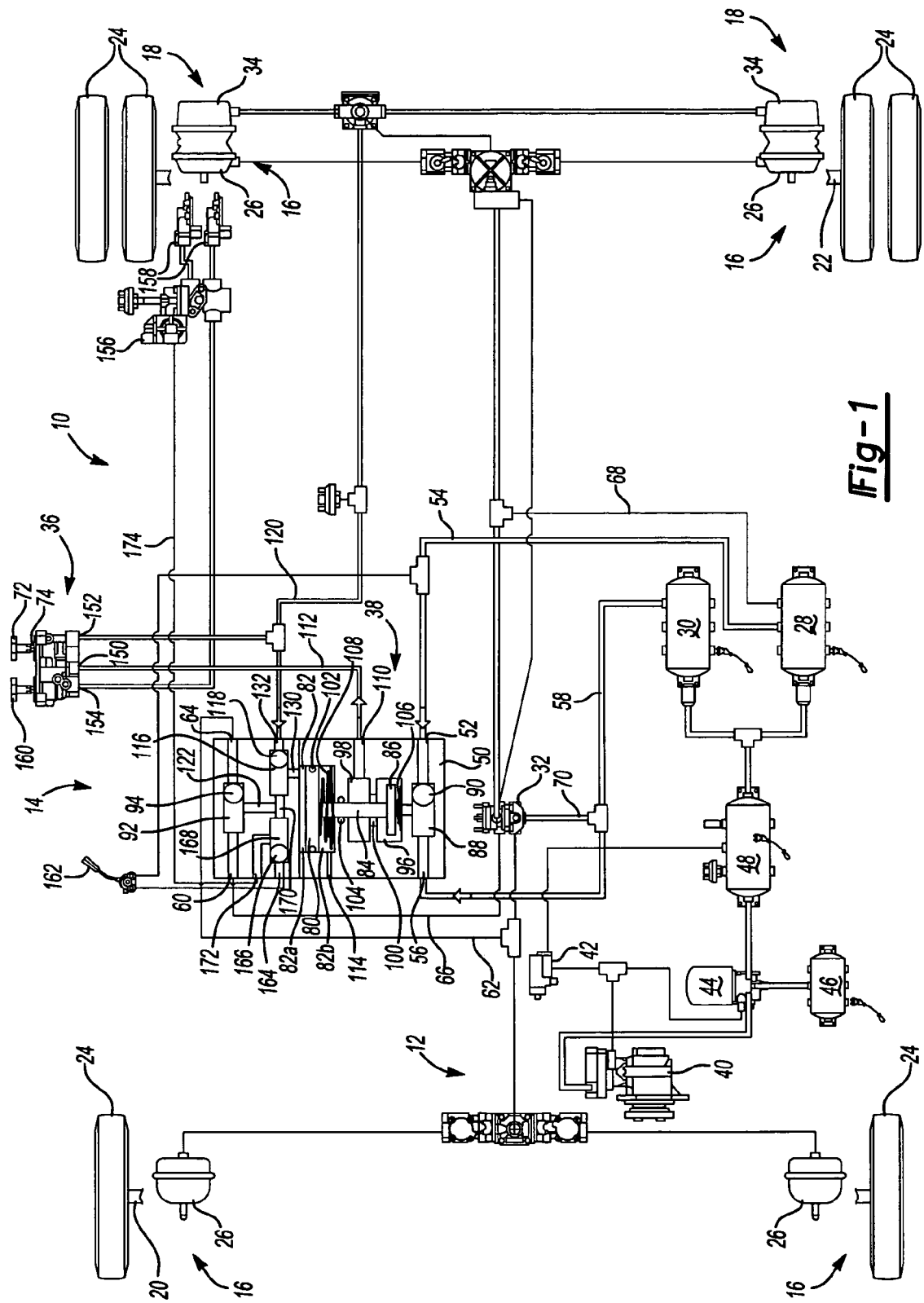
FIG. 1 is a schematic view of a tractor-trailer brake system with a park brake control valve and interlock valve assembly incorporating the subject invention wherein the interlock valve assembly is shown in an open position.

A brake system 10 for a heavy-duty vehicle, such as a tractor-trailer vehicle, includes a service brake system 12 and a park brake system 14 shown in FIG. 1. The service brake system 12 includes service brakes 16 that are used to slow or stop the heavy-duty vehicle during normal vehicle operation. The park brake system 14 includes park brakes 18 that are moved between an applied position and a released position.

The heavy-duty vehicle typically includes a front axle 20 and a rear axle 22. The front axle 20 is typically a steer axle and could be a drive or non-drive axle. The rear axle 22 is typically either a single drive axle or a tandem drive axle. FIG. 1 shows a single drive axle, however, it should be understood that the subject park brake system 14 could also be used on a tandem drive axle.

The front 20 and rear 22 axles each include a set of wheels 24. Each wheel 24 includes a service brake 16. In the example shown, each service brake 16 includes a brake actuator 26 that is connected to a primary air supply 28 and a secondary air supply 30 via a service brake control valve 32. The primary 28 and secondary 30 air supplies preferably operate independently from each other, such that if one of the primary 28 and secondary 30 air supplies has a failure, the other of the primary 28 and secondary 30 air supplies can serve as a back-up.

When a vehicle operator actuates the service brakes 16, via a foot pedal (not shown) or some other similar brake actuating mechanism, the service brake control valve 32 delivers air from one of the primary 28 or secondary 30 air supplies to the service brakes 16 for the front 20 and rear 22 axles. The air pressurizes the spring chambers to apply the service brake 16 at each wheel 24. When the vehicle operator releases the service brakes 16, air is exhausted from the brake actuator 26 to release the service brakes 16 at each wheel 24.

In the example shown in FIG. 1, each wheel 24 on the rear axle 22 includes a park brake 18. Each park brake 18 includes a park brake spring chamber 34 that is connected to the primary 28 and secondary 30 air supplies via a park brake control valve 36 and an interlock valve assembly 38. During normal vehicle operation, the park brake spring chambers 34 are pressurized to hold the park brakes 18 in a released position. When the vehicle operator communicates a park brake apply command to the park brake control valve 36, air is exhausted from the park brake spring chambers 34 and the park brakes 18 are applied. It should be understood that while FIG. 1 shows park brakes 18 only on the rear axle 22, the front axle 20 could also include park brakes 18.

The brake system 10 includes a compressor 40 and air governor 42 that are fluidly connected to an air dryer 44. The air dryer 44 includes a purge 46 for purging water and other contaminants. The primary 28 and secondary 30 air supplies are each fluidly connected to a wet tank 48 that is located downstream from the air dryer 44. The wet tank 48 removes any remaining moisture from the air before the air is supplied into the primary 28 and secondary 30 air supplies. The operation of the compressor 40, air governor 42, air dryer 44, purge 46, and wet tank 48 are well-known and will not be discussed in further detail.

The interlock valve assembly 38 and the park brake control valve 36 cooperate such that the park brakes 18 can only be released in response to a park release command if the services brakes 16 are applied. In other words, once the park brakes have been moved into the applied position, the vehicle operator must actuate the service brake 16 before the park brakes 18 can be moved to the released position. The interlock valve assembly 38 is moveable between an open position where air from the primary 28 or secondary 30 air supply is communicated to the park brake control valve 36 and a closed position where air is prevented from being communicated to the park brake control valve 36.

Figure 2:
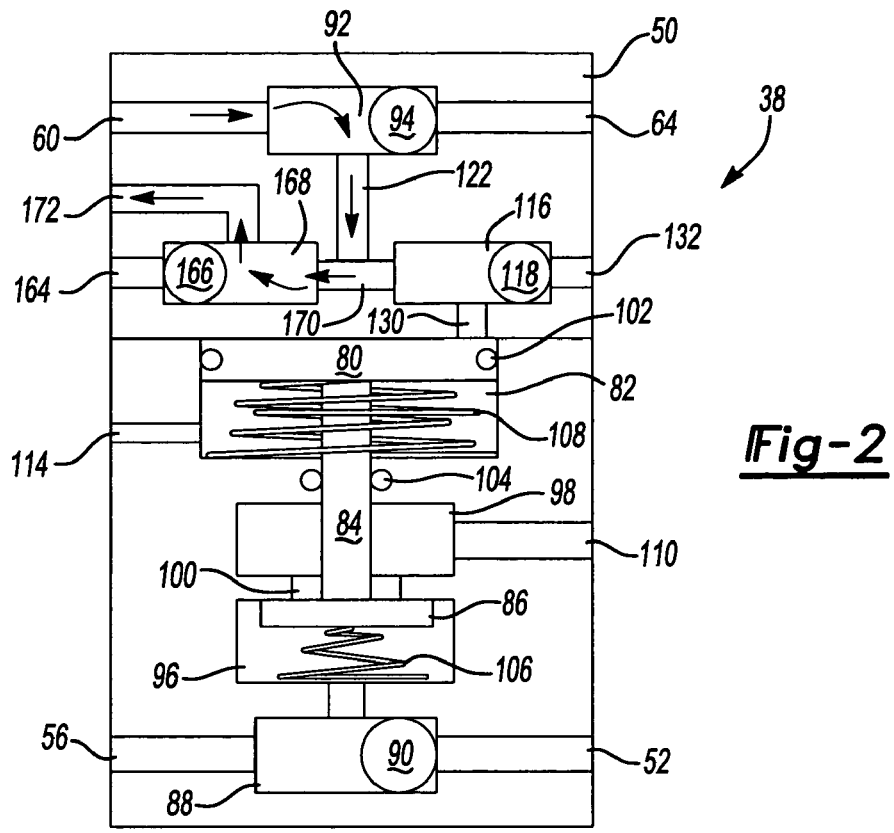
FIG. 2 is a schematic view of the interlock valve assembly of FIG. 1 in the closed position and showing primary air flow to a tractor protection valve.

The interlock valve assembly 38 is shown in an open position in FIG. 1 and in the closed position in FIG. 2. The interlock valve assembly 38 is located upstream from the park brake control valve 36, which reduces the number of air connections that extend into a cab portion of the heavy-duty vehicle. This will be discussed in greater detail below.

The interlock valve assembly 38 includes a valve body 50 having a first inlet port 52 fluidly connected to the primary air supply 28 with a first connecting line 54, and a second inlet port 56 fluidly connected to the secondary air supply 30 with a second connecting line 58. The valve body 50 also includes a third inlet port 60 fluidly connected to the service brake control valve 32 with a third connecting line 62 and a fourth inlet port 64 fluidly connected to the service brake control valve 32 with a fourth connecting line 66. The service brake control valve 32 is fluidly connected to the primary air supply 28 with a fifth connecting line 68 and is also fluidly connected to the secondary air supply 30 with a sixth connecting line 70. Thus, the first 52 and second 56 inlet ports are in direct fluid communication with the primary 28 and secondary 30 air supplies, while the service brake control valve 32 controls fluid communication between the third 60 and forth 64 inlet ports and the primary 28 and secondary 30 air supplies.

The first 54, second 58, third 62, fourth 66, fifth 68, and sixth 70 connecting lines can be formed from any type of connecting line known in the art including rigid tubing members or rubber hose lines, for example. Further, the first 54, second 58, third 62, fourth 66, fifth 68, and sixth 70 connecting lines are just one example of a connecting configuration that could be used to interconnect the interlock valve assembly 38 with the park brake control valve 36 and the primary 28 and secondary 30 air supplies. The interlock valve assembly 38 could be integrated into the service brake control valve 32 and/or park brake control valve 36 to reduce the number of connecting lines.

The park brake control valve 36 is operably connected to a park brake actuator 72, located within the cab portion of the heavy-duty vehicle. Typically, the park brake actuator 72 is located with a vehicle dash so that the vehicle operator can easily control the park brake actuator 72. The park brake actuator 72 can be a button, lever, or other similar mechanism and includes a resilient member 74 that resiliently biases the park brake actuator in the applied position. If the service brake 16 is not applied when the vehicle operator attempts to move the park brake actuator 72 to a released position, the resilient member 74 will return the park brake actuator 72 to the applied position, which provides a visual indication to the vehicle operator that the park brakes 18 have not been released. The interlock valve assembly 38 is preferably located remote from the park brake actuator 72 and away from the vehicle dash to reduce the number of air connections that would be routed into the cab portion.

The interlock valve assembly 38 also includes a piston 80 slidably received within a piston chamber 82 formed within the valve body 50. A piston shaft 84 is coupled to the piston 80 at one end and cooperates with a valve disc 86 at an opposite end. A first valve chamber 88 is formed within the valve body 50 between the first 52 and second 56 inlet ports. A first two-way check valve 90 is received within the first valve chamber 88. A second valve chamber 92 is formed within the valve body 50 between the third 60 and fourth 64 inlet ports. A second two-way check valve 94 is received within the second valve chamber 92. The piston 80, piston shaft 84, valve disc 86, and piston chamber 82 are positioned within the valve body 50 between the first 88 and second 92 valve chambers.

The valve disc 86 is received within a disc chamber 96, which is spaced apart from the piston chamber 82. An intermediate chamber 98 is formed within the valve body 50 between the piston 82 and disc 96 chambers. The piston shaft 84 extends from the piston 80 through an opening, into the intermediate chamber 98, and terminates at the valve disc 86 in the disc chamber 96. The intermediate chamber 98 and disc chamber 96 are fluidly connected with each other by a passage 100. The piston 80 is sealed against an inner wall of the piston chamber with a first seal 102 and the piston shaft 84 is sealed within the opening with a second seal 104. Thus, air does not flow between the piston chamber 82 and the intermediate chamber 98.

A first spring 106 reacts between a wall of the disc chamber 96 and the valve disc 86. A second spring 108 reacts between a wall of the piston chamber 82 and the piston 80. The valve disc 86 is smaller in size than the disc chamber 96 such that when the interlock valve assembly 38 is in the open position, air can flow from the first valve chamber 88 into the disc chamber 96, around the valve disc 86, and into the intermediate chamber 98.

The valve body 50 also includes an outlet port 110, which is fluidly connected to the park brake control valve 36 with a seventh connecting line 112. The outlet port 110 is in fluid communication with the intermediate chamber 98.

The piston chamber 82 is separated by the piston 80 into a first chamber portion 82*a* and a second chamber portion 82*b*. The second spring 108 is located within the second chamber portion 82*b*. A vent 114 is formed within the valve body 50 to allow air from the second chamber portion 82*b* to be vented to atmosphere when the second spring 108 is compressed as the interlock valve assembly 38 is moved from the closed position to the open position.

The interlock valve assembly 38 also includes a third valve chamber 116 that receives a third two-way check valve 118. The third valve chamber 116 is fluidly connected to a park brake air connecting line 120 downstream of the park brake control valve 36. The park brake air connecting line 120 fluidly connects the park brake control valve 36 to the park brakes 18 on the rear axle 22. The third valve chamber 116 is also fluidly connected to the second valve chamber 92 via a passage 122. The third two-way check valve 118 controls air flow from the park brake air connecting line 120 to the first chamber portion 82*a* of the piston chamber 82 and controls air flow from the second valve chamber 92 to the first chamber portion 82*a*.

As discussed above, the park brakes 18 cannot be released unless the service brake 16 is applied at the same time that the park brake actuator 72 is moved to a release position. The interlock valve assembly 38, park brake control valve 36, and service brake control valve 32 cooperate to provide this feature in the following manner. Air from the primary 28 and secondary 30 air supplies enter the valve body 50 through the first two-way check valve 90 to provide blended air to the park brake control valve 36 via the interlock valve assembly 38. This eliminates the need for a two-way check valve in the park brake control valve 36 itself, such as would occur in a traditional configuration. This means that one air connecting line is removed from cab installation.

The first two-way check valve 90 is controlled by whichever of the primary 28 or secondary 30 air supplies has the higher air pressure. In the example shown in FIG. 1, the secondary air supply 30 has the higher air pressure, thus the first two-way check valve 90 is moved to the right and air can pass the first two-way check valve 90. Normally, the interlock valve assembly 38 is in the closed position as shown in FIG. 2, where the valve disc 86 is seated against the valve body 50 such that air cannot flow from the disc chamber 96 to the intermediate chamber 98. The first spring 106 should have a spring force that is sufficient to hold the valve disc 86 in the closed position such as when the service brakes 16 are not applied and the park brake 18 is in the applied position.

Once the park brakes 18 are in the applied position, if the park brake actuator 72 is moved to a park release position nothing happens because the outlet port 110 cannot deliver air to the park brake control valve 36 due to the position of the valve disc 86. Without supply air, the park brake control valve 36 cannot deliver air to release the park brake spring chambers 34. Additionally, the park brake actuator 72 cannot stay in the park release position once the vehicle operator releases the park brake actuator 72 because the resilient member 74 returns the park brake actuator 72 to the park applied position. This provides visible evidence to the vehicle operator that the park brakes 18 are not released.

If the service brakes 16 are applied, control pressure is delivered from the service brake control valve 32 to the second two-way check valve 94. The dominant control pressure from the service brake control valve 32 passes through the second two-way check valve 94 and then enters the third valve chamber 116. Air flows from the third valve chamber 116 and into the first chamber portion 82*a* of the piston chamber 82 via passage 130. This air pressure forces the piston 80 down to compress the second spring 108. This also moves the piston shaft 84 to engage and move the valve disc 86. Movement of the valve disc 86 compresses the first spring 106 and moves the interlock valve assembly 38 to the open position by unseating the valve disc 86.

In the open position, the valve disc 86 allows air from the primary 28 and secondary 30 air supplies to be sent out via the outlet port 110 to the park brake control valve 36. If the park brake actuator 72 is now moved into the release position, then air passes through the park brake control valve 36 and into the park brake air connecting line 120 to release the springs which sets park brakes 18. The same air that releases the park brakes 18 is also sent to an inlet port 132 of the third valve chamber 116. This air passes through the third two-way check valve 118 and replaces service brake control air when the vehicle operator releases the service brake 16. In other words, after a service brake application, the seventh connecting line 112 remains pressurized and the third two-way check valve 118 is moved to the left in FIG. 1. This provides air to hold down the piston 80 as long as the park brake actuator 72 is in the release position.

When the park brake actuator 72 is moved to the park or applied position, the air holding the park brakes 18 in the released position is allowed to vent to atmosphere through an exhaust port in the park brake control valve 36 or via a quick release valve 136. When the park brakes 18 are exhausted, then the inlet port 132 is also exhausted, which allows the first 106 and second 108 springs to push the valve disc 86 and piston 80 to the closed position. Once in the closed position, air cannot be supplied to the park brake control valve 36 until the service brake 16 is applied.

Another feature of the subject brake system concerns braking that is provided to a trailer (not shown) towed by the tractor. The park brake control valve 36 includes a park brake valve inlet 150 that is in direct fluid communication with the outlet port 110, a first park brake valve outlet 152 that is in fluid communication with park brakes 18 for the rear axle 22, and a second park brake valve outlet 154 that is in fluid communication with a tractor protection valve 156. The tractor protection valve 156 includes glad hands 158, which serve as connectors to provide a fluid supply connection from the tractor to the trailer.

As discussed above, the park brake control valve 36 includes an actuator 72 controlled by a vehicle operator to apply the park brakes 18 for the rear axle 22. The park brake control valve 36 includes another actuator 160 that is controlled by the vehicle operator to apply park brakes on trailer axles (not shown). The vehicle operator also can control a trailer hand control valve 162 located in the tractor. The hand control valve 162 can be used to brake the trailer independently from the tractor, or optionally the hand control valve 162 can be used to provide proportional braking on the trailer to supplement tractor braking.

The interlock valve assembly 38 includes a trailer inlet port 164 that is fluidly connected to the trailer hand control valve 162. A fourth two-way check valve 166 is received within a fourth valve chamber 168 formed within the valve body 50. The fourth valve chamber 168 is fluidly connected to passage 122 and the second valve chamber 92 via passage 170. The interlock valve assembly 38 also includes a trailer outlet port 172 that fluidly connects the fourth valve chamber 168 to the tractor protection valve 156. An air connecting line 174 provides the connection between the trailer outlet port 172 and the tractor protection valve 156.

During operation, the interlock valve assembly 138 can supply an air signal from the primary air supply 28, the secondary air supply 30, or the hand control valve 162 to the tractor protection valve 156. This unique configuration only requires the single connecting line 174 between the trailer outlet port 172 and the tractor protection valve 156. Thus, one connecting line takes the place of three connecting lines that were traditionally required. This is a significant cost savings, facilitates assembly, and increases packaging space for other components because two connecting lines do not have to be routed from the tractor to the trailer. This utilization of check valves is unique because they serve two functions, supplying protected control air to the tractor protection valve 156 and to the park brake interlock valve assembly 38.

Figure 3:
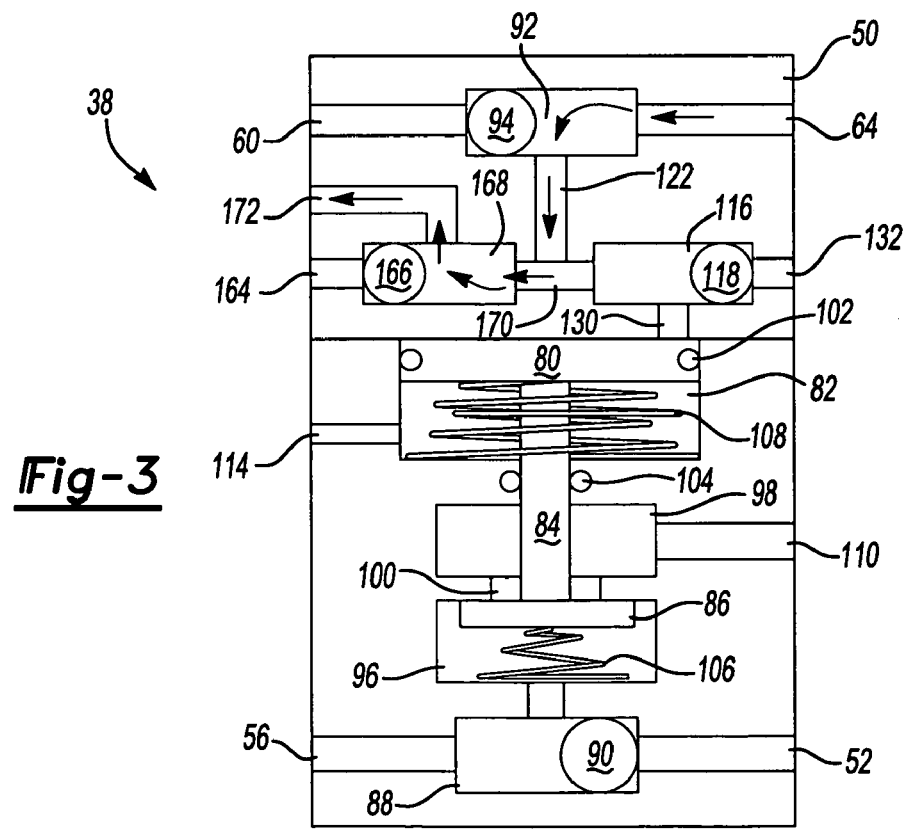
FIG. 3 is a schematic view of the interlock valve assembly of FIG. 1 in the closed position and showing secondary air flow to the tractor protection valve.

FIG. 2 shows the interlock valve assembly 38 with the valve disc 86 in the closed position. FIG. 3 shows an air signal being generated by the trailer outlet port 172 from the primary air supply 28. The air signal in this configuration flows through the fourth inlet port 64 into the second valve chamber 92, through passage 122 and into passage 170. This forces the fourth two-way check valve 166 to move to the left, which closes a fluid connection to the trailer hand control valve 162. The air then flows through the fourth valve chamber 168, out trailer outlet port 172 and into the connecting line 174 to the tractor protection valve 156.

FIG. 2 is similar to FIG. 3, but shows the air signal being generated from the trailer outlet port 172 from the secondary air supply 30. The air signal in this configuration flows through the third inlet port 60 into the second valve chamber 92, through passage 122 and into passage 170. This forces the forth two-way check valve 166 to move to the left, which closes the fluid connection to the trailer hand control valve 162. The air then flows through the fourth valve chamber 168, out trailer outlet port 172 and into the connecting line 174 to the tractor protection valve 156.

Figure 4:
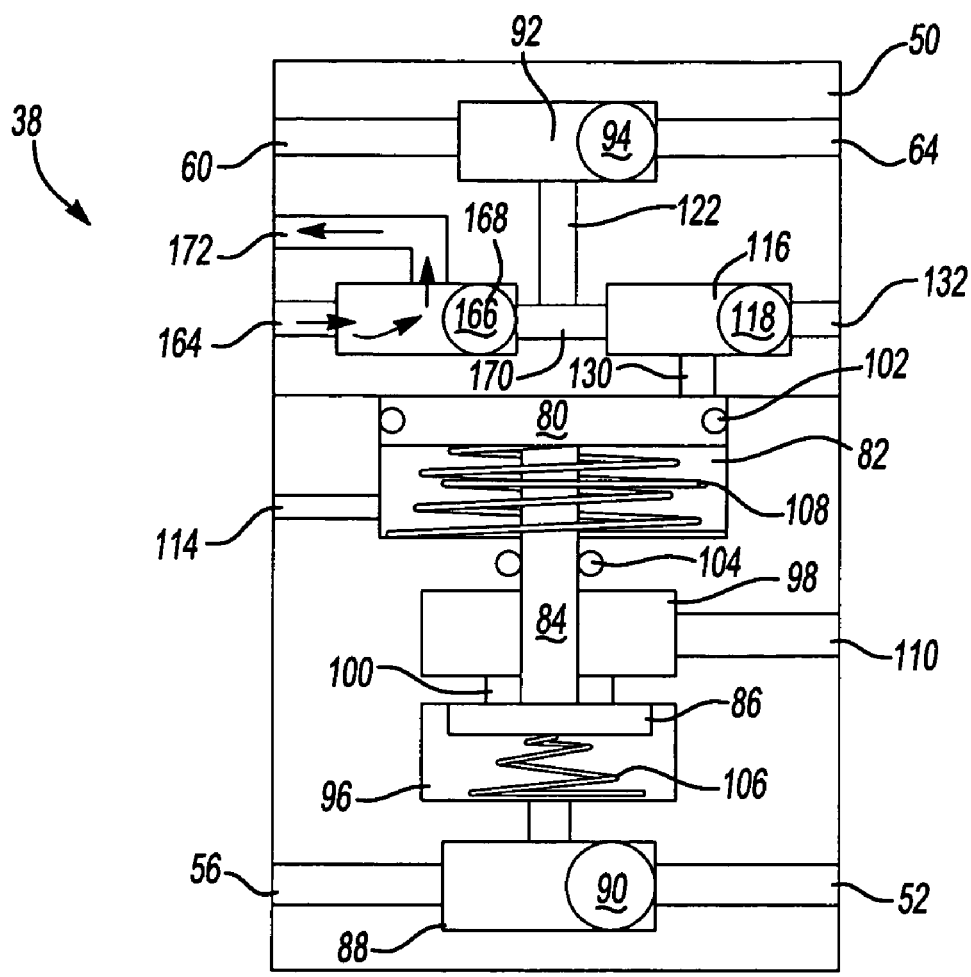
FIG. 4 is a schematic view of the interlock valve assembly of FIG. 1 in the closed position and showing trailer hand control air flow to a tractor protection valve.

FIG. 4 shows the air signal being generated from the trailer hand control valve 162. The air signal in this configuration flows through the trailer inlet port 164 and into the fourth valve chamber 168. This forces the fourth two-way check valve 166 to move to the right, which closes the fluid connection to both the primary 28 and secondary 30 air supplies. The air then flows out the trailer outlet port 172 and into the connecting line 174 to the tractor protection valve.

The subject brake system 10 provides many benefits including the prevention of a park brake release in response to an accidental or inadvertent movement of the park brake actuator 72 to the release position. Passengers and/or objects moving about within the cab portion cannot accidentally release the park brake 18. Additionally, if a vehicle operator is in a driver seat and releases the park brake 18 in combination with applying the service brake 16, vehicle "rollaway" is prevented because the vehicle operator's foot is already on the service brake 16.

Another advantage is that the second spring 108 can be configured to provide a spring force set at a minimum pressure value that would automatically block the supply air required to hold park brakes 18 in the release position if pressure fell below the minimum pressure value. If, for example, both the primary and secondary air systems were experiencing leaks, overall pressure can fall as low as 40 psi. Traditionally, if the pressure falls to 40 psi, the park brake control valve is activated to exhaust all air to apply the park brakes 18. The vehicle operator may attempt to drive the vehicle by holding the park brake control valve in the release position to "limp home" with only 40 psi pressure in the braking system. To prevent this "limp home" mode, the second spring 108 in the interlock valve assembly 38 is biased to automatically move the interlock valve assembly 38 to the closed position if pressure falls below a predetermined pressure value. The vehicle operator cannot override the application of the second spring 108.

Another advantage includes combining multiple check valves into a common valve body 50. This reduces plumbing connections and potential leak points. Further the interlock valve assembly 38 is installed upstream of the park brake control valve 36 where plumbing lines, i.e. connecting lines, are shorter and less exposed to damage.

Another advantage is that a single air connection interconnects the tractor protection valve 156 to the interlock valve assembly 38. This single air connection replaces three air connections that would otherwise have been required to separately connect the primary air supply 28, secondary air supply 30, and trailer hand control valve 162 in traditional configurations. Further, check valves that have been traditionally located within the tractor protection valve 156 have been incorporated into the interlock valve assembly 38. The subject invention provides a tractor protection valve 156 that does not include any check valves. This simplifies the tractor protection valve and provides a significant cost savings.

The subject invention is reliable, simple in construction, and has no failure modes that might unintentionally release the park brakes 18. Also, the interlock valve assembly 38 includes a second two-way check valve 94 that insures operation in the event of a primary or secondary air supply failure. Finally, the interlock valve assembly 38 provides a method for supplying an air signal to the tractor protection valve 156 from any of the primary air supply 28, secondary air supply 30, or trailer hand control valve 162.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A brake valve assembly for a tractor and trailer park brake system comprising:
   a trailer hand control valve;
   an interlock valve assembly including a valve body having at least a first interlock inlet adapted for fluid connection to the trailer hand control valve, a second interlock inlet adapted for fluid connection to an air supply, at least one interlock outlet adapted for fluid connection to a tractor protection valve, and a check valve assembly cooperating with said first and second interlock inlets and said at least one interlock outlet to supply an air signal to the tractor protection valve from one of the air supply and said trailer hand control valve to apply a trailer brake; and
   a park brake control valve having fluid connections to trailer and tractor park brakes, said valve body including a park valve outlet that is fluidly connected to said park brake control valve, and wherein said valve body includes at least one air supply port adapted for direct fluid connection to the air supply and wherein said valve body houses a valve disc that prevents an air signal from being delivered from said at least one air supply port to said park brake control valve via said park valve outlet unless a service brake has been applied.

2. The brake valve assembly according to claim 1 wherein said check valve assembly includes a first check valve cooperating with said first interlock inlet and a second check valve cooperating with said second interlock inlet, said first check valve fluidly connecting said first interlock inlet to said at least one interlock outlet when said trailer hand control valve is unactuated and said second check valve fluidly connecting said second interlock inlet to said at least one interlock outlet when said trailer hand control valve is actuated.

3. The brake valve assembly according to claim 2 wherein the air supply includes a primary air supply and a secondary air supply separate from the primary air supply, and wherein said second interlock inlet includes a primary inlet and a secondary inlet with said first check valve directing fluid flow from said primary and said secondary inlets to said at least one interlock outlet.

4. The brake valve assembly according to claim 3 including an air connection line fluidly connecting said at least one interlock outlet to the tractor protection valve wherein said air connection line supplies said air signal from one of said primary air supply, said secondary air supply, and said trailer hand control valve.

5. The brake valve assembly according to claim 4 wherein said air connection line is the only connection between said at least one interlock outlet and the tractor protection valve.

6. The brake valve assembly according to claim 1 wherein said park brake control valve has a park valve inlet, a first park valve outlet for fluid connection to the tractor park brake, and a second park valve outlet for fluid connection to the trailer park brake via the tractor protection valve and wherein said at least one interlock outlet includes a first interlock outlet adapted for fluid connection to the tractor protection valve and a second interlock outlet fluidly connected to said park valve inlet.

7. The brake valve assembly according to claim 1 wherein in response to a service brake application, pressure is delivered from a service brake control valve to said second interlock inlet to unseat said valve disc and allow an air signal to be communicated from said at least one air supply port, through said park valve outlet, and to said park brake control valve.

8. A brake system for a tractor-trailer vehicle comprising:
   a trailer hand control valve selectively actuated to provide braking to a trailer;
   a park brake control valve including at least a first actuator for moving a tractor park brake between applied and released positions and a second actuator for moving a trailer park brake between applied and released positions;
   a tractor protection valve fluidly connected to said park brake control valve; and
   an interlock valve assembly including a valve body with a plurality of inlets comprising a first interlock inlet adapted for fluid connection to said trailer hand control valve and a second interlock inlet adapted for fluid connection to an air supply wherein the air supply comprises a primary air supply and a secondary air supply separate from the primary air supply, and wherein said second interlock inlet comprises a first primary inlet fluidly connectable to the primary air supply and a first secondary inlet fluidly connectable to the secondary air supply;

wherein said plurality of inlets includes a second primary inlet fluidly connectable to the primary air supply and a second secondary inlet fluidly connectable to the secondary air supply;

wherein said valve body includes a plurality of outlets comprising a first interlock outlet fluidly connected to said tractor protection valve and a second interlock outlet fluidly connected to said park brake control valve, and wherein said interlock valve assembly includes a valve assembly cooperating with said first and said second interlock inlets and said first interlock outlet to supply an air signal to said tractor protection valve from one of the air supply and said trailer hand control valve to apply a trailer brake;

wherein said valve assembly cooperates with said second primary inlet and said second secondary inlet to fluidly connect the primary and the secondary air supplies to said second interlock outlet;

wherein said valve assembly includes a first two-way check valve received within a first valve chamber formed within said valve body, a second two-way check valve received within a second valve chamber formed within said valve body, and a third two-way check valve received within a third valve chamber formed within said valve body wherein said first two-way check valve fluidly connects one of said first primary inlet and said first secondary inlet to said first interlock outlet, said second two-way check valve fluidly connects said trailer hand control valve to said first interlock outlet, and said third two-way check valve fluidly connects one of said second primary inlet and said second secondary inlet to said second interlock outlet;

a piston received within a piston chamber formed within said valve body and an intermediate chamber formed within said valve body intermediate said piston chamber and said third valve chamber wherein said intermediate chamber fluidly connects said third valve chamber to said second interlock outlet; and wherein said valve assembly cooperates with said first interlock inlet and said second interlock outlet to fluidly connect said park brake control valve to the air supply to release at least one of the trailer park brake and tractor park brake.

9. The brake system according to claim 8 including an air connection line fluidly connecting said first interlock outlet to said tractor protection valve wherein said air connection line supplies said air signal from one of the primary air supply, the secondary air supply, and said trailer hand control valve.

10. The brake system according to claim 9 wherein said air connection line is the only fluid connection between said first interlock outlet and said tractor protection valve.

11. The brake system according to claim 8 including a valve disc adapted for movement with said piston wherein said valve disc is moveable between a closed position where fluid flow from said second primary inlet and said second secondary inlet is prevented from entering said intermediate chamber and an open position where said fluid flow from said second primary inlet and said second secondary inlet is allowed to enter said intermediate chamber and wherein said piston moves said valve disc from said closed position to said open position in response to a service brake application.

12. A method for controlling trailer braking comprising:
(a) providing an interlock valve assembly fluidly connecting an air supply to a park brake control valve, the interlock valve assembly including a valve body having at least one air supply inlet port adapted for direct fluid communication with the air supply, at least one service brake control valve inlet port in fluid communication with the air supply, and an outlet port in fluid communication with the park brake control valve;
(b) fluidly connecting the interlock valve assembly to a tractor protection valve;
(c) communicating an air signal from the interlock valve assembly to the tractor protection valve in response to a trailer brake command;
(d) preventing an air signal from being communicated from the at least one air supply inlet port to the outlet port to release a parking brake if service brakes have not been applied; and
(e) allowing an air signal to be communicated from the at least one air supply inlet port to the outlet port to release a parking brake if the service brakes have been applied by pressurizing the at least one service brake control valve inlet port.

13. The method according to claim 12 wherein step (b) includes providing only one air connection between the interlock valve assembly and the tractor protection valve.

14. The method according to claim 13 wherein the air supply includes a primary air supply and a secondary air supply and wherein the air signal is comprised of air from one of the primary air supply, secondary air supply, and a trailer hand control valve.

15. The method according to claim 14 including fluidly connecting one of the primary and secondary air supplies to the park brake control valve to release one of a trailer park brake and a tractor park brake only in response to a combination of a service brake application and a park brake release command.

* * * * *